United States Patent [19]

McPherson et al.

[11] Patent Number: 4,789,251
[45] Date of Patent: Dec. 6, 1988

[54] COOLING NETWORKS FOR PCD BEARING SURFACES

[75] Inventors: James N. McPherson, Orange, Calif.; David R. Hall, Provo, Utah

[73] Assignee: Smith International, Inc., Newport Beach, Calif.

[21] Appl. No.: 158,771

[22] Filed: Feb. 22, 1988

Related U.S. Application Data

[63] Continuation of Ser. No. 864,788, May 19, 1986, abandoned.

[51] Int. Cl.[4] .................. F16C 37/00; F16C 33/26; E21B 17/10
[52] U.S. Cl. .................. 384/317; 175/320; 384/282; 384/907.1
[58] Field of Search ............... 384/95, 110, 112, 123, 384/282–285, 291, 293, 297, 313, 317, 320, 321, 370, 371, 420, 907.1; 175/320

[56] References Cited

U.S. PATENT DOCUMENTS

| | | | |
|---|---|---|---|
| 473,473 | 4/1892 | Peck | 384/315 X |
| 2,991,837 | 7/1961 | Postlewaite | 384/313 X |
| 3,455,619 | 7/1969 | McGrath | 384/313 X |
| 3,549,214 | 12/1970 | Neilson | 384/95 |
| 3,696,875 | 10/1972 | Cortes | 175/329 |
| 4,190,301 | 2/1980 | Lachonius et al. | 384/95 |
| 4,345,798 | 8/1982 | Cortès | 384/907.1 X |
| 4,468,138 | 8/1984 | Nagel | 384/907.1 X |
| 4,560,014 | 12/1985 | Geczy | 384/123 X |
| 4,620,601 | 11/1986 | Nagel | 384/282 X |
| 4,662,348 | 5/1987 | Hall et al. | 384/907.1 X |

FOREIGN PATENT DOCUMENTS

2054064 4/1980 United Kingdom .

Primary Examiner—Stuart S. Levy
Assistant Examiner—Thomas R. Hannon
Attorney, Agent, or Firm—Price, Gess & Ubell

[57] ABSTRACT

Polycrystalline diamond wear surfaces in bearing structures are maintained at temperatures that prevent thermal degradation in spite of exceptionally high loads. This temperature control is accomplished by segmenting the diamond wear surface to provide interrupt channels through which the energy build-up at the diamond wear surface is maintained below the thermal degradation level. Cooling fluid may be caused to flow through the interrupt channels, the higher the velocity of fluid flow around the diamond bearing surface, the greater the cooling effect.

36 Claims, 2 Drawing Sheets

COOLING NETWORKS FOR PCD BEARING SURFACES

This is a continuation of application Ser. No. 864,788 filed May 19, 1986 now abandoned.

1. Field of the Invention

The subject invention relates to bearings and particularly to polycrystalline diamond bearings having dramatically increased load carrying capabilities.

2. Description of the Prior Art

Polycrystalline diamond (PCD) bearings have found application in oil drilling and other environments demanding high load carrying ability under extreme wear conditions. Diamond bearings have been constructed which have inserts comprising tungsten carbide discs with a polycrystalline diamond surface layer.

Polycrystalline diamond bearings in oil drilling applications have exhibited a useful but limited load carrying ability. Load carrying ability is typically measured in units of "PV", the pressure or unit load to which the bearing is subjected multiplied by its velocity. Quantitatively, "PV" is a unit of heat or energy. When the PV limit of the polycrystalline diamond bearings is reached, the bearings begin to degrade and ultimately disintegrate. Replacement of any bearing in a downhole environment is expensive because of the nature of the parts and the downtime involved. A bearing having high load carrying ability and a long life cycle has been earnestly pursued by the drilling industry and others.

It is therefore an object of the invention to provide a bearing structure having hitherto unobtainable load carrying ability and longevity.

Another object of the invention is to extend the PV range within which PCD bearings can operate without exhibiting wear.

It is another object of the invention to provide enhanced cooling mechanisms for the PCD surface areas employed in bearings.

It is yet another object of the invention to provide bearings for oil drilling applications that have increased life and load bearing capacity in the drilling involvement.

SUMMARY OF THE INVENTION

Those objects and the general purpose of the invention are accomplished by providing a diamond bearing construction that is maintained below its degradation temperature by a cooling mechanism that is convenient to the bearing application. The cooling mechanism utilized is directed towards removing the energy build-up generated at the surface of the diamond bearing as a result of the rubbing friction between the bearing surfaces. The energy build up at the surface is controlled by a mechanism that reduces the time periods of heat or energy build up between cooling. Some mechanisms that function to this end are an array of numerous small diamond pads combining to make up a bearing surface, diamond bearing segments with interrupt grooves formed at their peripheries, or solid diamond bearing surfaces with interrupt grooves or channels cut into the diamond surface. A fluid is advantageous in removing the energy build up (heat) from the surface of the diamond in any of the above mechanisms. An alternate mechanism for controlling the energy build-up on the surface of the diamond is to emerse the entire bearing in a cooling medium.

BRIEF DESCRIPTION OF THE DRAWINGS

Other objects and many of the attendant advantages of this invention will be readily appreciated as the invention becomes better understood by reference to the following detailed description when considered in conjunction with the accompanying drawings in which like reference numerals designate like parts throughout the figures thereof and wherein.

DESCRIPTION OF THE PREFERRED EMBODIMENTS

BACKGROUND DISCUSSION

It has been recognized that at some PV level, thermal degradation and graphitization of the PCD begins to occur, i.e. the PCD begins to return to the state of graphite from which it was originally formed. PCD diamond has a certain amount of Cobalt material in it. Cobalt has a thermal expansion coefficient that is ten times that of diamond. At 730° C. the Cobalt has expanded to the point of causing the diamond to fracture. At 1200° C. the diamond starts to graphatize. A procedure that discloses use of thermal degradation for the purpose of buffing diamond bearing surfaces is disclosed in a patent application entitled Burnishing Diamond filed June 20, 1985 and having U.S. Ser. No. 747,163 now U.S. Pat. No. 4,662,348.

It appears that energy build-up at the bearing surfaces (heat) is the primary contributor to the thermal degradation problem. It was discovered that by keeping the diamond bearing surface below its degradation temperature regardless of the load, the amount of load the PCD bearings can accomodate without wear increases appreciably. It was surprising that this phenomena was true for exceptionally high loads (PV). The limiting factor appears to be the effectiveness of the surface energy controlling mechanism.

The build up of surface energy can be controlled by providing interrupt grooves in the diamond bearing surface and introducing cooling fluids into the surface area. This prevents thermal degradation, which includes graphitization, and resulting in a dramatic improvement in load carrying and wear characteristics. Various channel configurations are possible for introducing the fluid so as to optimize the energy dissipation effect in different environments and applications in which the bearings may be used.

Unlike other materials, PCD exhibits no appreciable wear until thermal degradation beings, leading to graphitization. By proper application of the principles of the invention, bearings accomodating heretofore unheard of loads without noticeable wear can be fabricated. PCD bearings fabricated with surface cooling means have performed at PV levels on the order of 16 million without noticeable wear. No bearings known to the inventors have achieved this performance. It appears that bearings accomodating even higher loads are quite possible.

DETAILED DESCRIPTION OF EMBODIMENTS

Figure 1:
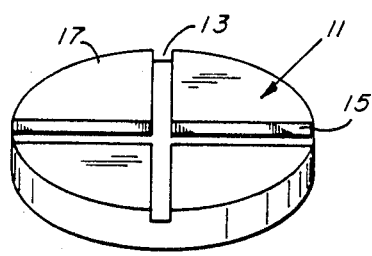
FIG. 1 shows a perspective of a PCD insert according to a preferred embodiment of the invention.

A preferred embodiment of a PCD bearing insert 11 having interrupt grooves or channels 13, 15 through which cooling fluid flows is shown in FIG. 1. The grooves 13, 15 are preferably created in the PCD surface 17 by EDM (electrical discharge machining). Either wire EDM or plunge EDM may be used. They may also be created by laser cutting or other applicable methods such as molding, for example. For one application they are 1/32" wide by 1/32" deep.

Figure 3:
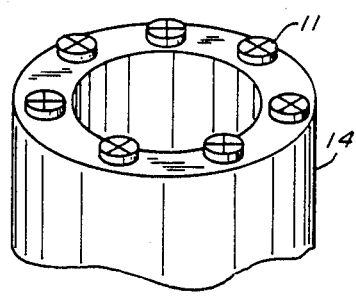
FIG. 3 is a perspective of the thrust bearing of FIG. 2.
Figure 4:
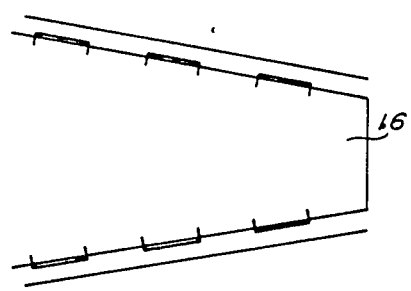
FIG. 4 is a sectional view of a roller cone bearing including PCD inserts.

Such PCD inserts may be used in an endless variety of bearing applications, for example in a cylindrical thrust bearing element (FIG. 2 and 3) or in a conical roller cone bearing element 16 (FIG. 4). The conical element 16 accomodates both thrust and radial forces, and bearings accomodating either thrust or radial forces alone can be fabricated using inserts according to the preferred embodiment. The use of PCD inserts in thrust bearings is more specifically described in a patent application entitled Diamond Bearing and Manufacturing Thereof, filed May 20, 1986 and having U.S. Ser. No. 865,159 now U.S. Pat. No. 4,708,496. The use of PCD inserts in roller cones is more specifically described in a patent application entitled Polycrystalline Diamond Bearing System for a Roller Cone Rock Bit, filed May 19, 1986 and having U.S. Ser. No. 864,681 now U.S. Pat. No. 4,738,322, and patent application entitled Transition Layer Polycrystalline Diamond Bearing, filed May 19, 1986, having U.S. Ser. No. 864,683 now U.S. Pat. No. 4,729,440

Figure 2:
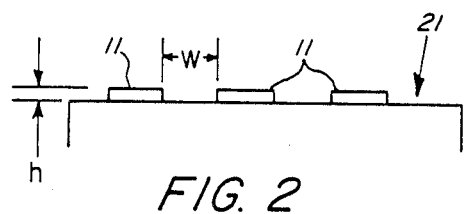
FIG. 2 is a side view of a thrust bearing employing PCD inserts according to a preferred embodiment.

In a thrust bearing such as shown in FIG. 2 and 3, planar faced bearing inserts may be brazed into equally spaced wells arrayed on a circle on a cylindrical steel mounting member 14. Alternatively, such inserts may be press-fit into through holes in an annular steel mounting ring. The mounting ring and inserts together with an annular brazing ring may then be registered in place on a steel mounting member and the assembly heated to attach the inserts and ring to the mounting member. In a downhole oil drilling application, the fluid used to cool the PCD in such a thrust bearing is the drilling fluid.

Figure 5:
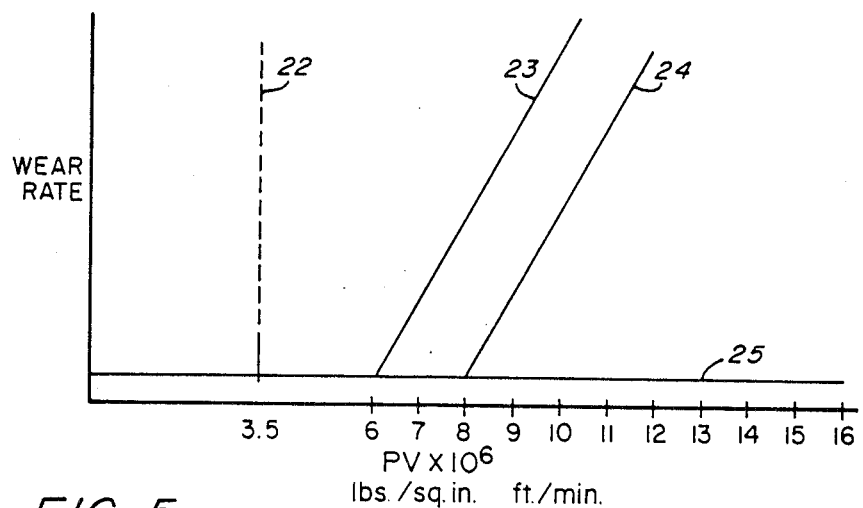
FIG. 5 is a graph of PV vs. wear.

Tests results of a thrust bearing such as illustrated in FIGS. 2 and 3 using inserts .529 inches in diameter are shown in FIG. 5. FIG. 5 maps bearing wear rate along the vertical axis and generated heat (PV) in (lbs./sq.in.) times (ft./min.) along the horizontal axis. The design load capability without regard to surface energy control is illustrated by dashed line 22 at PV=3.5 million. When the height h (FIG. 2) of the PCD surface above its mounting surface 21 is set at ⅛ inch and the space between the inserts w is set to provide a cooling fluid flow velocity of approximately 25 ft./second past and around the inserts, wear begins to occur at about 6 million PV as shown at 23 in FIG. 5. When the height h is set at 1/16 inch and the fluid flow velocity is at approximately 50 ft./second, wear does not begin to occur until about PV=8 million, as shown at 24.

When interrupt grooves 13, 15 are added to the inserts 11 at h=1/32 inches and velocity equals 50 to 100 ft./second, a dramatic improvement occurs in that the bearing may be operated out to PV equals 5 to 16 million without any noticeable wear, as shown at 25. It is believed that even higher PV may be obtained with the interrupt grooves 13, 15. The actual limit of this structure has not been determined because the test equipment available to the inventors cannot create PV higher than 16 million.

The foregoing improvement in wear capability has been verified in both high velocity, low pressure and high pressure low velocity embodiments. A downhole motor thrust bearing such as illustrated in FIG. 2 and 3 has a relatively high velocity, low pressure application. A roller cone such as shown in FIG. 4 has a high pressure, low velocity application.

The discoveries set forth above suggest that enhanced fragmentation of the PCD surface area through more intricate structures can achieve even greater wear capability, possibly up to 100 million PV or more without wear. Embodiments of more intricate structures are illustrated in FIGS. 6-11.

Figure 6:
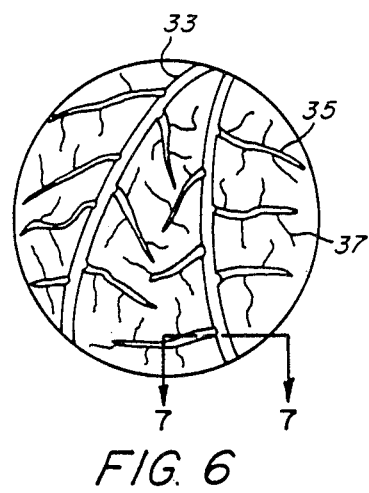
FIG. 6 illustrates an arterial cooling fluid network.
Figure 7:
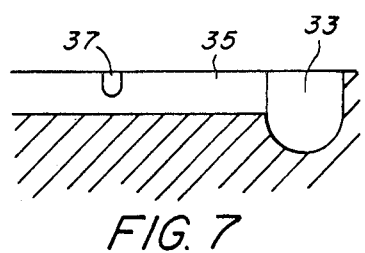
FIG. 7 is a cross-section of the network of FIG. 6 taken along 7—7.
Figure 8:
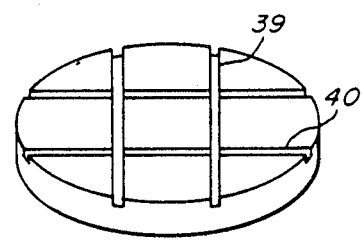
FIG. 8 illustrates a matrix cooling fluid network.
Figure 9:
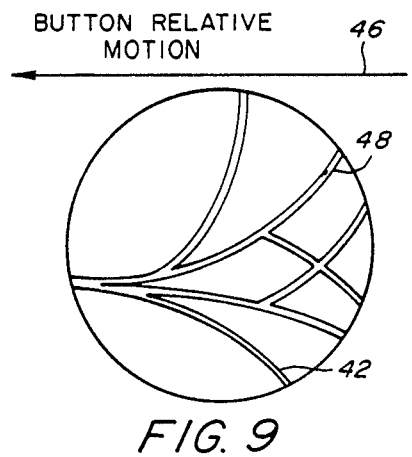
FIG. 9 illustrates a directional cooling fluid network.

FIGS. 6 and 7 shows a structure comprising successively smaller grooves or channels, 33, 35, 37 referenced as arteries 33, veins 35, and capillaries 37. FIG. 8 illustrates a matrix structure having channels 39 crossing channels 40. FIG. 9 shows a structure designed to promote surface area energy control by using the relative motion of the insert 46 with respect to the fluid as a pump. When operating in a pool of fluid, a network which acts as a pump to pull fluid through the network, is highly desirable.

Figure 10:
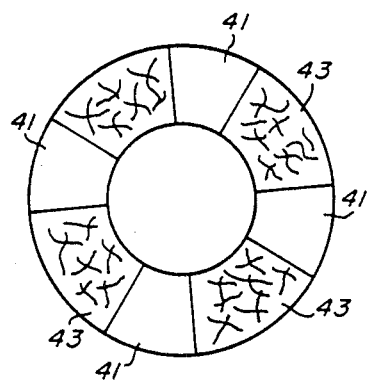
FIG. 10 illustrates a flow network in an annular surface.

FIG. 10 illustrates flow channels 41 created in an annular PCD surface layer 43. Fluid flow-up through the central cylindrical opening 44 of the annulus (perpendicular to the plane of the paper in FIG. 10) and out through the flow channels 41 provides energy control of the PCD surface.

Figure 11:
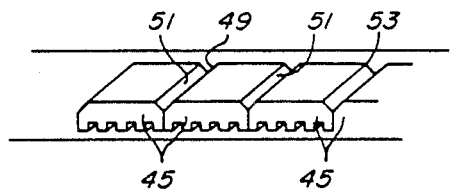
FIG. 11 illustrates an array of PCD tiles creating a matrix network.

FIG. 11 shows an embodiment employing PCD "tiles" 45 which have bevelled or otherwise descending surfaces 51 at their interior edges 49, 51, 53. When the tiles are placed adjacent one another, a matrix grooved PCD surface results.

A variety of structures, including modifications, extensions or adaptations of those just disclosed, will be evident to those skilled in the art from the foregoing disclosure. Therefore, it is to be understood that, within the scope of the appended claims, the invention may be practiced other than as specifically described herein.

What is claimed is:

1. An improved bearing structure comprising:
   a continuous polycrystalline diamond bearing surface; and
   channel means in said surface for preventing thermal degradation of said surface in the presence of high bearing loads in excess of eight million PV (lbs./sq. in.) (ft./min.).

2. A bearing structure comprising:
   a plurality of bearing inserts each having a diamond bearing face;
   channel means for conducting fluid flow through a plurality of said faces; and
   means for mounting said bearing inserts in bearing position.

3. The bearing structure of claim 2 wherein said fluid flow providing means includes a flow channel in each said bearing face.

4. The bearing structure of claim 2 wherein said fluid flow providing means comprises cross channels scribed into the diamond faces of said inserts.

5. The bearing structure of claim 2 wherein said fluid flow providing means comprises cross channels in each said bearing face.

6. The bearing structure of claim 5 wherein said channels are 1/32-in. wide × 1/32-in. deep and wherein the bearing surface provided by said face is 1/32– to 1/16-in. above the surface of said mounting means.

7. The bearing structure of claims 2, 3, 4, 5 or 6 wherein said inserts each have a planar face and are mounted by said mounting means such that their planar faces all lie in a common plane.

8. The bearing structure of claims 2, 3, 4, 5 or 6 wherein said mounting means comprises a frusto conical bearing element.

9. A bearing structure comprising:
a plurality of cylindrical bearing inserts having planar diamond faces;
means for mounting said inserts in a circular array such that their faces lie substantially in a common plane; and
fluid flow channel means formed in each of a plurality of the faces of said inserts.

10. The bearing structure of claim 9 wherein said diamond is polycrystalline diamond.

11. A bearing comprising:
an annular planar plycrystalline diamond (PCD) surface having a central cylindrical opening; and
flow channel means in said PCD surface for conducting fluid from said central cylindrical opening through said surface.

12. An improved bearing structure, comprising:
a diamond bearing surface; and
means for maintaining the energy buildup on the surface of said diamond bearing below the thermal degradiation level at bearing loads in excess of eight million PV (lbs./sq. in.) (ft./min.).

13. The improved bearing structure of claim 12 wherein said diamond bearing surface comprises a plurality of individual diamond areas segmented by channels therebetween.

14. The improved bearing structure of claim 13 wherein said means for maintaining the energy buildup below the thermal degradation level comprises cooling fluid circulating in said channels at high velocity.

15. The improved bearing structure of claim 12 wherein said diamond bearing surface is segmented by channels cut into the diamond surface.

16. The improved bearing structure of claim 15 wherein said means for maintaining the energy buildup below the thermal degradation level comprises cooling fluid circulating in said channels at high velocity.

17. An improved bearing structure, comprising:
a diamond on diamond bearing interface; and
means for maintaining the energy buildup at the surface of said diamond bearing interface below its thermal degradation level at PV values in excess of $8 \times 10^6$ (lbs./sq. in.) (ft.min.).

18. The improved bearing structure of claim 17 wherein said means for maintaining energy buildup comprises said bearing surfaces being a plurality of individual segments having channels therebetween.

19. The improved bearing structure of claim 18 wherein said means for maintaining energy buildup further comprises cooling fluid circulating in said channels at high velocity.

20. The improved bearing structive of claim 19 wherein said velocity is in the range of 50 to 100 feet per second.

21. The improved bearing structure of claim 17 wherein said means for maintaining energy buildup comprises channels cut into the bearing surface creating a plurality of segments.

22. The improved bearing structure of claim 21 wherein said means for maintaining energy buildup further comprises cooling fluid circulating in said channels at high velocity.

23. The improved bearing structure of claim 22 wherein said velocity is in the range of 50 to 100 feet per second.

24. An improved bearing structure comprising:
a diamond bearing surface; and
cooling fluid flow channel means in said diamond bearing surface, said fluid flow channel means comprising a plurality of branching flow grooves of descending fluid carrying capability.

25. An improved bearing structure comprising:
a diamond bearing surface; and
cooling fluid flow channel means in said diamond bearing surface, said fluid flow channel means comprising first and second flow grooves disposed perpendicularly to one another.

26. An improved bearing structure comprising:
a diamond bearing surface; and
cooling fluid flow channel means in said diamond bearing surface, said fluid flow channel means comprising a rectangular matrix of flow grooves.

27. An improved bearing structure comprising:
a diamond bearing surface; and
cooling fluid flow channel means in said diamond bearing surface for acting as a pump to pump cooling fluid through said surface.

28. A bearing structure comprising:
a plurality of bearing inserts each having a substantially planar diamond bearing face;
means for conducting fluid flow through a plurality of said faces at velocities in the range of 50 to 100 feet per second; and
means for mounting said bearing inserts in bearing position.

29. The bearing structure of claim 28 wherein said inserts comprise cylindrical inserts having a polycrystalline diamond (PCD) face.

30. The bearing structure of claim 29 wherein said fluid flow providing means comprises cross channels scribed into the PCD faces of said inserts.

31. The bearing structure of claim 30 wherein said channels are 1/32-in. wide × 1/32-in. deep and wherein the bearing surface provided by said face is 1/32- to 1/16-in. above the surface of said mounting means.

32. The bearing structure of claim 28 wherein said fluid flow providing means includes a flow channel in each said bearing face.

33. The bearing structure of claim 28 wherein said fluid flow providing means comprises cross channels in each said bearing face.

34. A bearing structure comprising:
a plurality of cylindrical bearing inserts each having a substantially planar polycrystalline diamond bearing face;
first and second channel means 1/32-in. wide x 1/32-in. deep for conducting fluid flow through a plurality of said faces at velocities in the range of 50–100 feet per second; and means for mounting said bearing inserts in bearing position above a planar surface with their centers on a common circle and their faces 1/32 - to 1/16-in. above said planar surface.

35. An improved bearing structure comprising:
a diamond bearing surface having a circular cross-section; and
cooling fluid flow channel means in said diamond bearing surface, said fluid flow channel means comprising first and second flow grooves disposed perpendicularly to one another, crossing substantially in the center of said circular cross-section and terminating at the periphery of said circular cross-section.

36. The bearing structure of claim 35 wherein said diamond bearing surface is supported by a cylindrical stud.

* * * * *

UNITED STATES PATENT OFFICE
CERTIFICATE OF CORRECTION

Patent No. 4,789,251    Dated December 6, 1988

Inventor(s) James N. McPherson and David Hall

It is certified that error appears in the above-identified patent and that said Letters Patent is hereby corrected as shown below:

Column 5, line 29, delete "plycrystalline" and substitute --polycrystalline-- therefor;

Column 5, line 38, delete "degradiation" and substitute --degradation-- therefor;

Column 6, line 1, delete "structive" and substitute --structure-- therefor.

Signed and Sealed this

Eighteenth Day of July, 1989

Attest:

DONALD J. QUIGG

Attesting Officer    Commissioner of Patents and Trademarks